May 30, 1933.  S. BRÜCK  1,912,251
GRIPPING DEVICE
Filed April 28, 1932  2 Sheets-Sheet 2

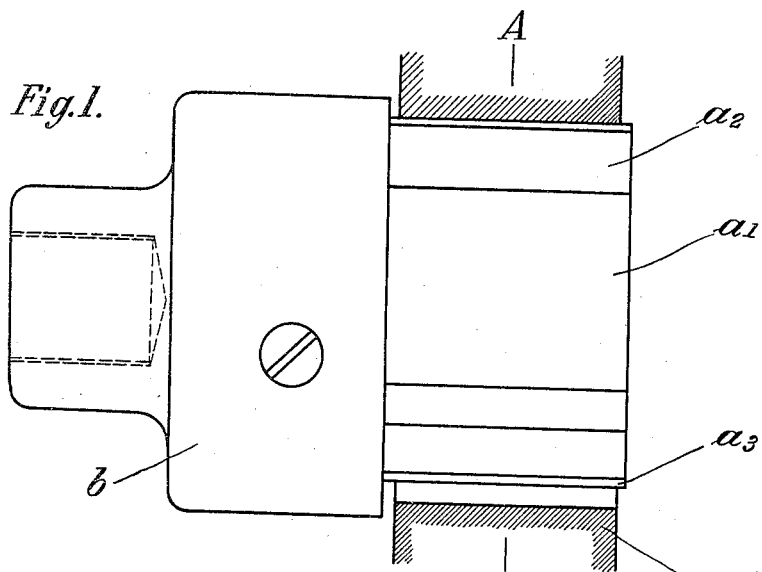
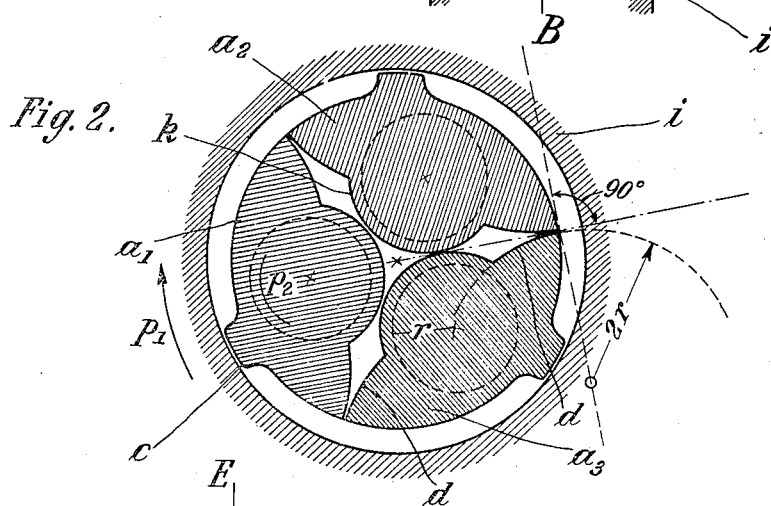
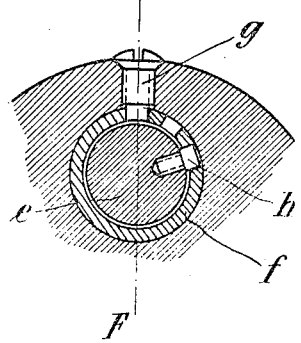

Inventor:
Stephan Brück
Strauch & Hoffman
Attorneys

Patented May 30, 1933

1,912,251

UNITED STATES PATENT OFFICE

STEPHAN BRÜCK, OF BERLIN, GERMANY

GRIPPING DEVICE        REISSUED

Application filed April 28, 1932, Serial No. 608,106, and in Germany April 30, 1931.

The invention refers to a chuck for gripping the inner periphery of hollow articles and is especially intended, to be used with lathes and similar machines; it also may be used for friction clutches so as to engage and disengage shafts when altering the spinning direction.

Chucks for gripping the inner surfaces of hollow articles are already known, where the object to be tooled is held by means of eccentric pawls or cylinders, guided on outwardly increased faces and where in consequence of the resistance, imparted to the object, the automatic clutching of the latter is performed.

In all these devices one or more intermediate parts are provided, which transmit the pressing effect of the pawls or cylinders respectively on the work-piece. Similarly special parts are arranged, which operate the guide of the pawls or cylinders, necessary for centering the work-piece.

This invention avoids all these intermediate parts and auxiliary parts. For the centric gripping of the work-piece only three specially shaped clamps are arranged, which are provided with cylindrical faces, rolling upon each other, and with also cylindrical centering-faces, touching one another, and friction-faces, being eccentric with each clamp member. The head, in which the three clamps are mounted, only serves as transmitting means.

In the two drawings one form of realization of the idea of this invention is given.

Figure 3:
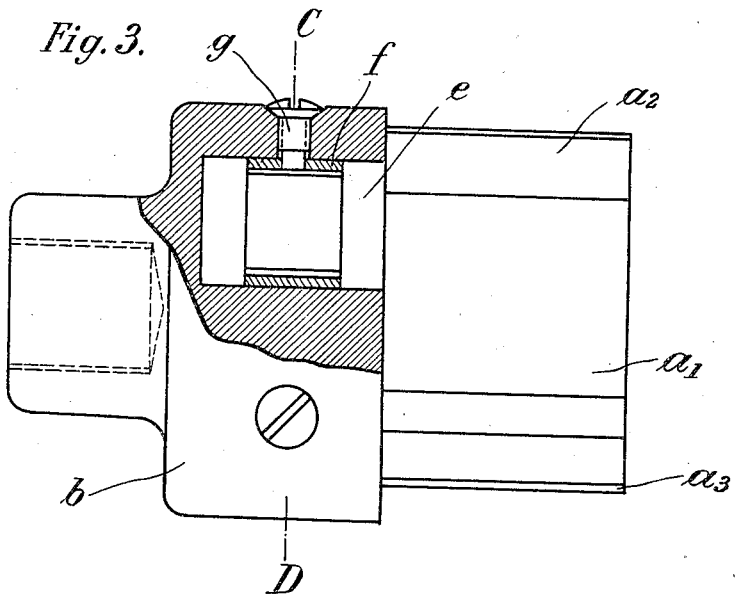
Figure 5:
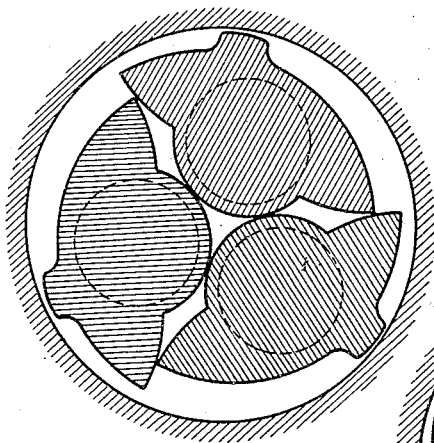
Figure 6:
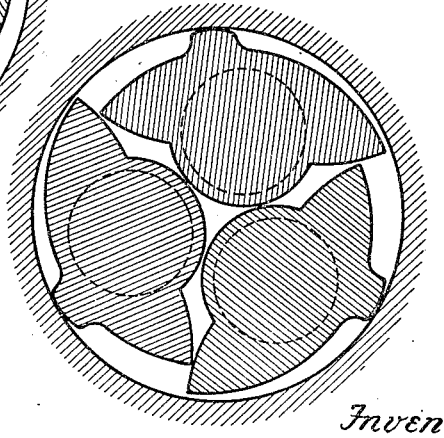

It signifies:

Fig. 1 a view of the clamping device with the gripped work-piece in section,

Fig. 2 a section right angular to the centre line through the clamps effecting the gripping and centering, Fig. 3 a view of the clamping device with a part section through the mounting of one clamp, Fig. 4 a section right angular to the centre line through the afore-said clamp mounting, Fig. 5 a section right angular to the centre line through the clamps at wide gripping range, Fig. 6 a section right angular to the centre line through the clamps at small range.

The gripping device consists of the three clamps $a1$, $a2$ and $a3$ pivotally mounted in the head $b$. This head may be supplied in the general way with a thread or flange for fixing in the spindle head of the lathe or with a simple bore for the reception of a shaft end.

The three clamps which are equally shaped are characterized by the following three faces one cylindrical face —$k$— with the radius $r$, the real gripping-face —$c$— and two equally shaped faces —$d$—. The three clamps are arranged with their said cylinder-faces $k$ to each other in such a way, that each of them rolls upon the two others and always around the axis of its cylinder face. The clamps are pivotally mounted by means of the cylindrical pivots —$e$— in the head $b$. By means of the ring shaped springs —$f$— which are fastened on the one end by the pin —$g$— to the head —$b$— and on the other one by the pin —$h$— to the pivot —$e$—, the clamps are turned in the direction of the arrow —$p2$—. By so turning the three clamps in the direction of the arrow —$p2$— the diameter of the circle, on the circumference of which the eccentrically arranged gripping-faces are located, is encreased; by turning in the opposite direction against the arrow —$p2$— the diameter is decreased.

The two faces —$d$— on each clamp also are cylindrical faces and have the radius $2r$. The mathematical construction of these faces is visible, in Fig. 2. By these cylinder-faces —$d$— the clamps are drivingly connected with each other in such a way that the actual turning angle of the clamps with mathematical accuracy is equal in size and direction for all three clamps. This means: the three gripping-faces —$c$— always are located centrically to each other; therefore the work-piece always is in centrical position to the middle line of the head or to that of the spindle-head of the lathe correspondingly.

At rest, or where there is no work-piece present, the gripping-faces —$c$— are pressed outwards by the ring springs —f—. The work-piece is pushed on the clamps right up to the head by slightly turning it in the direction against the arrow —p1—: to assist this the gripping-faces —c— are slightly tapered towards their front ends. After releasing the work-piece this is kept in an accurate central position in consequence of the turning movement of the clamps, which is effected by springs. If now the tool cuts into the work-piece and tends to push it in the direction of the arrow —p1— in consequence of the friction the gripping-faces are dragged along and pressed outwards. The greater the resistance is, which is exerted by the work-piece on the tool, the more perfect is the pressure of the gripping faces on this work-piece.

In the gripping process only the three clamps are engaged. All forces, which effect the gripping of the work-piece, are pure pressure forces and only act within the bore of the work-piece between the work-piece and the gripping-clamps and amongst these.

The gripping-clamps are strained by pressure forces only in direction right angular to their longitudinal axis, so that alterations of shape in the gripping device or a lessening of the gripping action are prevented. By this an absolute reliable gripping of the work-piece is ensured. The pivots, the ring springs and the head in no way are engaged in the actual process.

As there are no special parts for the centring there is also no danger for premature relax of the centring accuracy in consequence of wearout of such parts.

What I claim is:

A chuck for gripping the inner periphery of hollow articles comprising a chuck body three gripping clamps mounted for oscillation in said chuck body and subjected to the influence of springs, resisting or compelling oscillation, these clamps having cylindrical faces, rolling on each other, cylindrical centering faces, touching each other and article gripping faces excentric with each clamp member.

STEPHAN BRÜCK.